United States Patent
Momose

(10) Patent No.: US 9,643,612 B2
(45) Date of Patent: May 9, 2017

(54) VEHICLE CONTROL UNIT

(71) Applicant: NISSIN KOGYO CO., LTD., Ueda, Nagano (JP)

(72) Inventor: Masahiro Momose, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 14/869,386

(22) Filed: Sep. 29, 2015

(65) Prior Publication Data

US 2016/0090095 A1 Mar. 31, 2016

(30) Foreign Application Priority Data

Sep. 30, 2014 (JP) ................................. 2014-202452

(51) Int. Cl.
| | |
|---|---|
| *B60T 7/12* | (2006.01) |
| *B60W 30/18* | (2012.01) |
| *B60W 10/188* | (2012.01) |
| *B60W 10/04* | (2006.01) |
| *B60T 8/175* | (2006.01) |

(52) U.S. Cl.
CPC ........ *B60W 30/18172* (2013.01); *B60T 8/175* (2013.01); *B60W 10/04* (2013.01); *B60W 10/188* (2013.01); *B60T 2210/12* (2013.01)

(58) Field of Classification Search
USPC ......................................................... 701/83
See application file for complete search history.

(56) References Cited

U.S. PATENT DOCUMENTS

| | | | | | |
|---|---|---|---|---|---|
| 5,492,194 | A | * | 2/1996 | McGinn | B60K 17/344 180/233 |
| 6,000,488 | A | * | 12/1999 | Atkinson | B60K 17/342 180/197 |
| 6,341,826 | B2 | * | 1/2002 | Onogi | 180/197 |
| 9,180,848 | B2 | * | 11/2015 | Akamine | B60T 8/1755 |
| 2001/0038240 | A1 | * | 11/2001 | Yoshida | B60T 7/042 303/28 |
| 2001/0053953 | A1 | * | 12/2001 | Gong | B60T 8/17616 701/70 |

(Continued)

FOREIGN PATENT DOCUMENTS

JP 2003293818 10/2003

*Primary Examiner* — Hussein A. Elchanti
(74) *Attorney, Agent, or Firm* — Andrew M. Calderon; Roberts Mlotkowski Safran Cole & Calderon, P.C.

(57) ABSTRACT

The embodiment provides a vehicle control unit including a road surface friction coefficient estimation module. The road surface friction coefficient estimation module estimates a road surface friction coefficient based on a parameter other than a body speed. The vehicle control unit further includes first and second torque increment setting modules. The first second torque increment setting module sets an initial value of a torque increment to be used in the torque control when a start thereof is detected. The initial value of the torque increment is set based on the road surface friction coefficient. The second torque increment setting module sets a current value of the torque increment after the initial value has been set. The current value of the torque increment is set based on the previous value thereof and a change in the slip amount.

10 Claims, 14 Drawing Sheets

(56) References Cited

U.S. PATENT DOCUMENTS

| | | | |
|---|---|---|---|
| 2006/0185914 A1* | 8/2006 | Hommi | B60K 6/365 |
| | | | 180/65.1 |
| 2006/0258508 A1* | 11/2006 | Tanioka | B60R 25/04 |
| | | | 477/203 |
| 2016/0090922 A1* | 3/2016 | Momose | B60T 8/17636 |
| | | | 701/80 |

* cited by examiner

| ROAD SURFACE FRICTION COEFFICIENT | HIGH | MEDIUM | LOW | EXTREMELY LOW |
|---|---|---|---|---|
| TORQUE INCREMENT [Nm] | T1 | T2 | T3 | T4 |

*FIG. 6*

| BODY SPEED [km/h] | LOW SPEED | MEDIUM SPEED | HIGH SPEED |
|---|---|---|---|
| TORQUE INCREMENT [Nm] | T11 | T12 | T13 |

FIG. 11

| BRAKE FLUID PRESSURE [MPa] | P1 | P2 | P3 |
|---|---|---|---|
| TORQUE INCREMENT [Nm] | T21 | T22 | T23 |

*FIG. 13*

VEHICLE CONTROL UNIT

CROSS-REFERENCE TO RELATED APPLICATION(S)

This application claims priority from Japanese Patent Application No. 2014-202452 filed on Sep. 30, 2014, the entire contents of which are incorporated herein by reference.

FIELD

The present invention relates to a vehicle control unit which contributes to a torque control in which drive torque for a wheel is controlled based on a slip amount of the wheel.

BACKGROUND

A vehicle control unit may be configured to execute an engine brake torque control in which engine torque is controlled to restrict a wheel or wheels from locking when the wheels tend or are about to lock as a result of engine brake (for example, refer to JP-2003-293818-A). In such technique, a torque increase (a torque increment) of the engine torque may be set based on slip amounts of the wheels.

Such technique requires an accurate slip amount to appropriately set the torque increment. The slip amount is calculated based on a body speed (vehicle body speed) and wheel speeds, and the wheel speeds are normally accurately obtained from wheel speed sensors.

Thus, an accurate estimation of the body speed is important to acquire an accurate slip amount. On the other hand, the body speed may not always be accurately estimated depending on road surface conditions. As a result, the torque increment may also not be appropriately set.

SUMMARY

An aspect of the present invention provides
a vehicle control unit which contributes to a torque control in which drive torque for a wheel is controlled based on a slip amount of the wheel, including:
a road surface friction coefficient estimation module which estimates a road surface friction coefficient based on a parameter other than a body speed;
a determination module which determines whether or not the torque control can be executed;
a first torque increment setting module which sets an initial value of a torque increment to be used in the torque control when the determination module determines that the torque control starts, the initial value of the torque increment being set based on the road surface friction coefficient; and
a second torque increment setting module which sets a current value of the torque increment after the initial value has been set, the current value of the torque increment being set based on the previous value of the torque increment and a change in the slip amount.

According to the above-described configuration, since the initial value of the torque increment when the torque control starts is calculated without using the body speed, it is possible to set the initial drive torque to the appropriate value without being affected by the body speed. Additionally, since the second and later torque increments are set based on the previous value of the torque increment and the change in slip amount, it is possible to set the torque increments sufficiently accurately. The slip amount is a difference between the body speed and the wheel speeds, and hence, the slip amount cannot take an appropriate value unless the value of the body speed is accurate. In contrast with this, the change in slip amount relies more on the change in wheel speed than on the change in body speed, and therefore, the change in slip amount is affected less by the body speed because. Consequently, in setting the second and later torque increments, too, the torque increments can be set to appropriate values because the setting is affected less by the body speed, compared with, for example, a case where the torque increment is set based simply on the slip amount.

There may be provided the vehicle control unit, based on the above-described configuration,
wherein the torque control is a drive source brake torque control in which drive source brake torque which is applied from a drive source to a wheel is controlled by controlling drive source torque.

There may be provided the vehicle control unit, based on the above-described configuration,
wherein the second torque increment setting module is configured so as to set the previous value of the torque increment as the current value when a current value of the slip amount is equal to or smaller than the previous value.

According to this configuration, when the current value of the slip amount is equal to or smaller than the previous value, that is, when there is a tendency that the wheel speed recovers, since the torque increment is not reduced, the wheel speed is allowed to recover quickly.

There may be provided the vehicle control unit, based on the above-described configuration,
wherein the second torque increment setting module is configured so as to reduce gradually the torque increment with a predetermined gradient when the slip amount becomes equal to or smaller than an end-start threshold.

According to this configuration, since the torque increment is reduced gradually during a period when the slip amount stays in a range where the slip amount is equal to or smaller than the end-start threshold and is equal to or greater than an end threshold, it is possible to restrict the drive source brake from rising drastically within the period, thereby making it possible to restrict the occurrence of a risk of the slip amount being increased again by the drastic increase of the drive source brake.

There may be provided the vehicle control unit, based on the above-described configuration,
an acquisition module which acquires a target value of the drive source torque,
wherein the determination module determines that the torque control ends when the drive source torque reaches the target value.

According to this configuration, when the drive source torque reaches the target torque, that is, when the slip comes to an end, the EDC ends. Therefore, it is possible to execute the torque control which prevents the driver from feeling a sensation of physical disorder.

There may be provided the vehicle control unit, based on the above-described configuration,
wherein the second torque increment setting module increases an increment from the previous value of the torque increment greater as a variation in the slip amount becomes greater.

According to this configuration, it is possible to set the torque increment appropriately according to a variation in the slip amount.

There may be provided the vehicle control unit, based on the above-described configuration, wherein the road surface friction coefficient estimation module estimates the road surface friction coefficient for each of plural wheels, and wherein the first torque increment setting module sets an initial value of the torque increment based on a highest road surface friction coefficient among the plural estimated road surface friction coefficients.

According to this configuration, since the initial value of the torque increment is set based on the highest road surface friction coefficient among the plural estimated road surface friction coefficients, compared with, for example, a case where an initial value of the torque increment is set based on a lowest road surface friction coefficient, it is possible to restrict the drive source brake torque from becoming too small.

There may be provided the vehicle control unit, based on the above-described configuration, wherein the road surface friction coefficient is estimated based on brake torque, engine torque and wheel acceleration.

According to this configuration, the road surface friction coefficient can be calculated well without using the body speed.

There may be provided the vehicle control unit, based on the above-described configuration, a brake pressure control module which controls a brake pressure applied to the wheel, wherein the brake pressure control module is included in the road surface friction coefficient estimation module.

According to this configuration, the road surface friction coefficient which is estimated by the road surface friction coefficient estimation module can effectively be used in controlling the brake pressure using the brake pressure control module.

There may be provided the vehicle control unit, based on the above-described configuration, wherein the determination module determines whether or not a wheel tends to lock due to a drive source brake based on a body speed and a wheel speed, and determines that the torque control starts when the determination module determining that the wheel tends to lock.

According to this configuration, whether or not the wheel tends to lock due to the drive source brake can be determined based on the body speed and the wheel speed. Even though the timing at which the torque control starts deflects from an appropriate timing due to the value of the body speed being inaccurate as a result of the body speed being used for the torque control initiating conditions, since the initial value of the torque increment is set based on the road surface friction coefficient, initial drive torque can be set to an appropriate value which matches the road surface friction coefficient.

According to the invention, the torque increment can be set to an appropriate value in the torque control.

BRIEF DESCRIPTION OF DRAWINGS

FIG. 5A shows a map indicating a relationship between road surface friction coefficient and torque increment. FIG. 5B shows a map indicating a relationship between a variation in slip amount and a correction amount.

FIG. 6 is a map to which a second setting module refers, the map showing a relationship between a road surface friction coefficient and a torque increment.

FIG. 11 is a map to which a second setting module according a first modification refers.

FIG. 13 is a map to which a second setting module according to a second modification refers.

DETAILED DESCRIPTION

Figure 1:
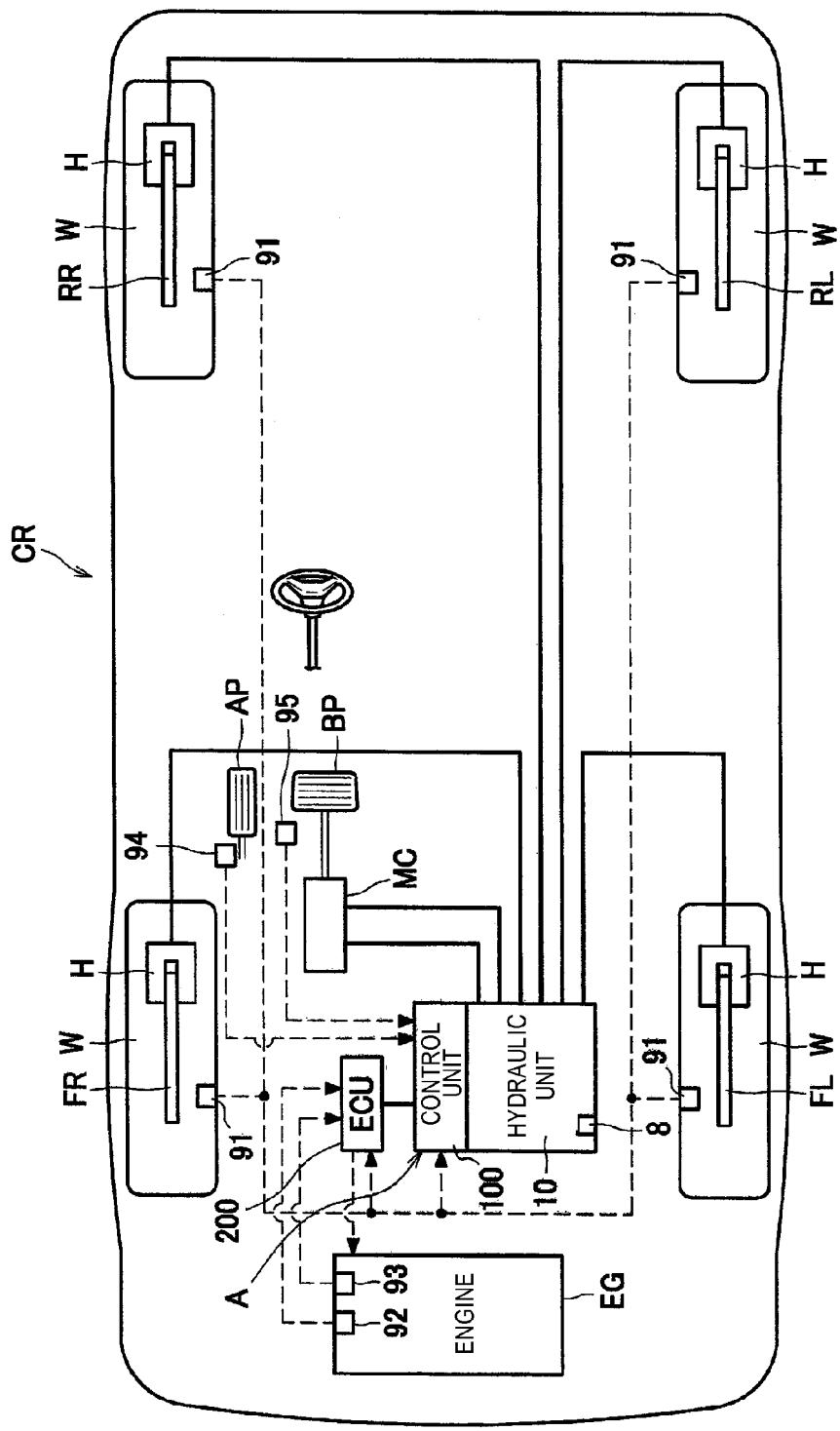
FIG. 1 is a block diagram of a vehicle which includes a vehicle control unit according to an embodiment.

An embodiment will be described in detail while referring to the drawings as required.

As shown in FIG. 1, a vehicle CR includes an ECU (Electronic Control Unit) 200, a vehicle brake hydraulic pressure control unit A which is an example of a vehicle control unit and a brake pressure control module, and an engine (internal combustion engine) EG which is an example of a drive source.

The ECU 200 is a control unit for controlling the whole of the vehicle including the control of the engine EG and is connected to a control unit 100 of the vehicle brake hydraulic pressure control unit A by means of a communication line, so that the transmission and reception of signals can be executed between the ECU 200 and the control unit 100. A torque sensor 92 and an engine rotation speed sensor 93 are connected to the ECU 200. The torque sensor 92 detects engine torque of the engine EG, and the engine rotation speed sensor 93 detects a rotation speed of the engine EG.

The ECU 200 includes, for example, a CPU (Central Processing Unit), a RAM (Random Access Memory), a ROM (Read Only Memory) and an input-output circuit and executes the control of the vehicle by performing various arithmetic operations based on inputs which are inputted from the control unit 100, the torque sensor 92 and the engine rotation speed sensor 93 and programs and data which are stored in the ROM.

The vehicle brake hydraulic pressure control unit A is intended to control braking forces (brake hydraulic pressures) which are given to wheels W of the vehicle CR and includes mainly the hydraulic unit 10 in which oil lines (hydraulic pressure lines) and various component parts are provided and the control unit 100 which controls the component parts in the hydraulic unit 10 as required.

Wheel speed sensors 91, an accelerator pedal stroke sensor 94, a brake pedal stroke sensor 95 and a pressure sensor 8 are connected to the control unit 100. The wheel speed sensors 91 detect wheel speeds Vw of the wheels W, the accelerator pedal stroke sensor 94 detects a stroke of an accelerator pedal AP, and the brake pedal stroke sensor 95 detects a stroke of a brake pedal BP. The pressure sensor 8 will be described later. The control unit 100 includes, for example, a CPU, a RAM, a ROM and an input-output circuit and controls the component parts by performing arithmetic operations based on inputs from the sensors 91, 94, 95, 8 and the ECU 200 and programs and data which are stored in the ROM.

Wheel cylinders H are hydraulic elements which convert brake hydraulic pressures which are generated by a master cylinder MC and the vehicle brake hydraulic pressure control unit A to operation forces of wheel brakes FR, FL, RR, RL which are provided on the wheels W and are connected to the hydraulic unit 10 of the vehicle brake hydraulic pressure control unit A by way of piping or pipe lines.

Figure 2:
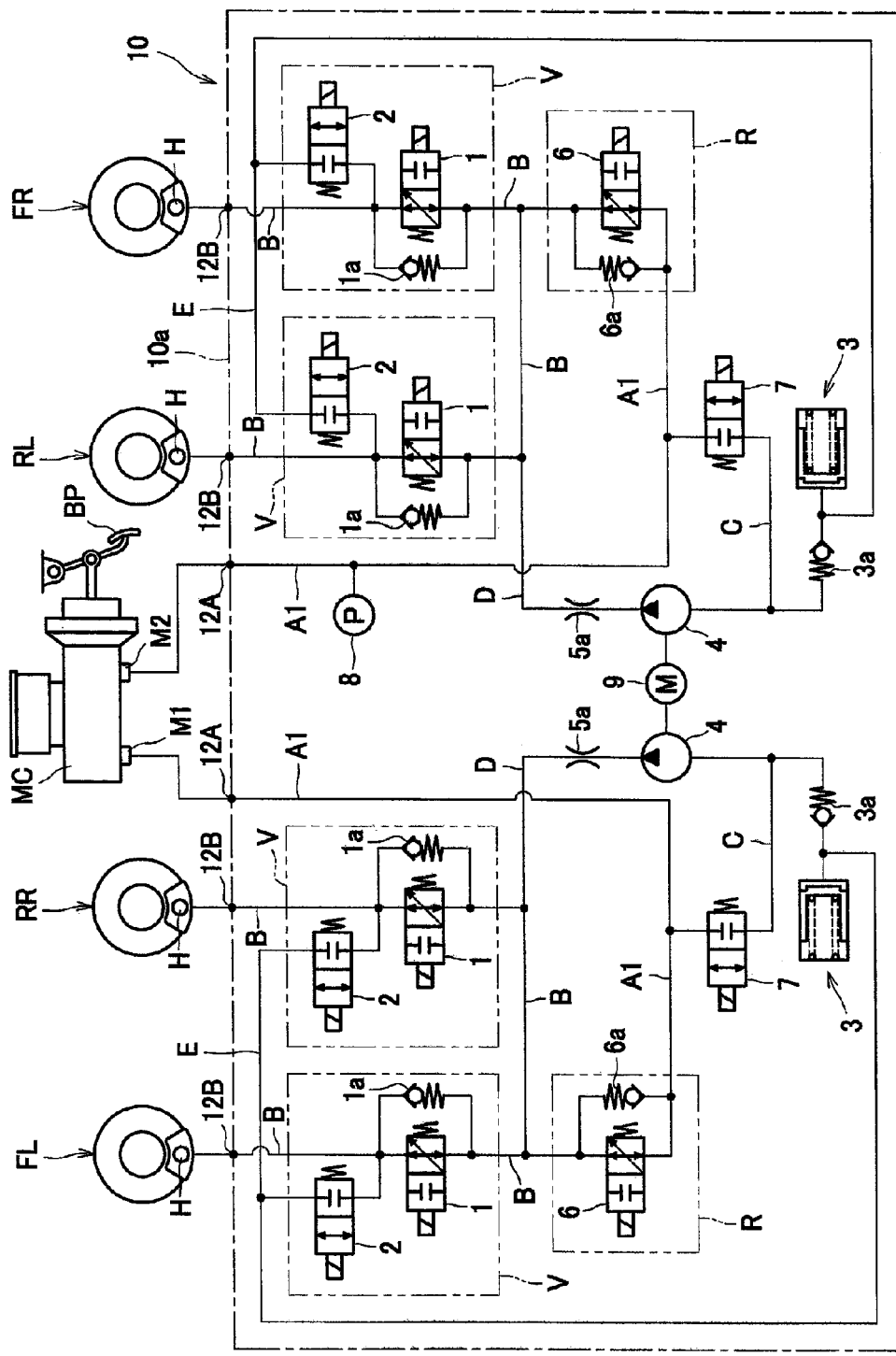
FIG. 2 is a block diagram of a hydraulic unit of a vehicle brake hydraulic pressure control unit.

As shown in FIG. 2, the hydraulic unit 10 is disposed between the master cylinder MC which is a hydraulic pressure source which generates a brake hydraulic pressure which matches pedal effort exerted on the brake pedal BP by the driver and the wheel brakes FR, FL, RR, RL. The hydraulic unit 10 is made up of a pump body 10a which is a base body having oil lines through which a brake fluid flows and pluralities of inlet valves 1 and outlet valves 2 which are disposed on the oil lines.

Two output ports M1, M2 of the master cylinder MC are connected to corresponding inlet ports 12A of the pump body 10a, and outlet ports 12B of the pump body 10a are connected to the corresponding wheels FL, RR, RL, FR. Normally, oil lines in the pump body 10a communicate from the inlet ports 12A to the outlet ports 12B, whereby pedal effort exerted on the brake pedal BP is transmitted individually to the wheels FL, RR, RL, FR.

An oil line which initiates from the output port M1 communicates with the wheel brake FL on the left front wheels and the wheel brake RR on the right rear wheel. An oil line which initiates from the output port M2 communicates with the wheel brake FR on the right front wheel and the wheel brake RL on the left rear wheel. In the following description, the oil line which initiates from the output port M1 is referred to as a "first system," and the oil line which initiates from the output port M2 is referred to as a "second system."

In the hydraulic unit 10, two control valve modules V are provided in the first system so as to correspond individually to the wheel brakes FL, RR. Similarly, two control valve modules V are provided in the second system so as to correspond individually to the wheel brakes RL, FR. In the hydraulic unit 10, a reservoir 3, a pump 4, an orifice 5a, a pressure regulating valve (a pressure regulator) R and a suction valve 7 are provided in each of the first system and the second system. A common motor 9 is provided in the hydraulic unit 10 to drive the pump 4 in the first system and the pump 4 in the second system. This motor 9 is a motor whose rotation speed can be controlled. In this embodiment, the pressure sensor 8 is provided only in the second system.

In the following description, oil lines initiating from the output ports M1, M2 of the master cylinder MC to reach the corresponding pressure regulating valves R are referred to as an "output hydraulic pressure line A1." Oil lines initiating from the pressure regulating valve R of the first system to reach the wheel brakes FL, RR and oil lines initiating from the pressure regulating valve R of the second system to reach the wheel brakes RL, FR are each referred to as a "wheel hydraulic pressure line B." Oil lines initiating from the output hydraulic pressure lines A1 to reach the pumps 4 are each referred to as a "suction hydraulic pressure line C." Oil lines initiating from the pumps 4 to reach the wheel hydraulic pressure lines B are each referred to as a "discharge hydraulic pressure line D." Oil lines initiating from the wheel hydraulic pressure lines B to reach the suction hydraulic pressure lines C are each referred to an "open line E."

The control valve modules V are valves configured to control the passage of hydraulic pressures from the master cylinder MC or the pumps 4 to the wheel brakes FL, RR, RL, FR (specifically, the wheel cylinders H) and can increase, hold or decrease the pressures of the wheel cylinders H. Because of this, the control valve modules V each include the inlet valve 1, the outlet valve 2 and a check valve 1a.

The inlet valves 1 are normally open solenoid valves which are provided between the wheel brakes FL, RR, RL, FR and the master cylinder MC, that is, along the wheel hydraulic pressure lines B. The inlet valves 1 are normally open to thereby permit the transmission of brake hydraulic pressures to the corresponding wheel brakes FL, FR, RL, RR from the master cylinder MC. The inlet valves 1 are closed by the control unit 100 when the wheels W are about to lock to thereby cut off the transmission of brake hydraulic pressures from the brake pedal BP to the respective wheel brakes FL, FR, RL, RR.

The outlet valves 2 are normally closed solenoid valves which are interposed between the respective wheel brakes FL, RR, RL, FR and the reservoirs 3, that is, between the wheel hydraulic pressure lines B and the open lines E. The outlet valves 2 are normally closed but are opened by the control unit 100 when the wheels W are about to lock to thereby release the brake hydraulic pressures applied to the respective wheel brakes FL, FR, RL, RR to the reservoirs 3.

The check valves 1a are connected in parallel to the inlet valves 1. The check valves 1a are one-way valves which permit only a flow of brake fluid from the wheel brakes FL, FR, RL, RR to the master cylinder MC. Upon release of an input from the brake pedal BP, even when the inlet valves 1 are left closed, the check valves 1a permit the flow of brake fluid from the wheel brakes FL, FR, RL, RR to the master cylinder MC.

The reservoirs 3 are provided on the open lines E and each have a function to absorb the brake hydraulic pressures which are released as a result of the outlet valves 2 being opened. Check valves 3a are interposed between the reservoirs 3 and the pumps 4 to permit only a flow of brake fluid from the reservoir 3 to the pump 4.

The pumps 4 are interposed between the suction hydraulic pressure lines C which communicate with the output hydraulic pressure lines A1 and the discharge hydraulic pressure lines D which communicate with the wheel hydraulic pressure lines B and each have a function to suck in the brake fluid reserved in the reservoirs 3 to discharge it to the discharge hydraulic pressure lines D. This can not only enable the brake fluid sucked in by the reservoirs 3 to return to the master cylinder MC but also generate a brake hydraulic pressure without an operation of the brake pedal BP by the driver to thereby generate, in turn, a braking force in the wheel brakes FL, RR, RL, FR.

The discharge amounts of brake fluid by the pumps 4 depend on the rotation speed of the motor 9. For example, the discharge amounts of brake fluid by the pumps 4 increase as the rotation speed of the motor 9 increases.

The orifices 5a dampen pulsations by the pressure of the brake fluid discharged from the pumps 4 and pulsations generated as a result of the operation of the pressure regulating valves R, which will be described later.

The pressure regulating valves R are each normally open to thereby permit flows of brake fluid from the output hydraulic pressure line A1 to the wheel hydraulic pressure lines B. When the pressures at the wheel cylinders H are increased by the brake hydraulic pressures generated by the pumps 4, the pressure regulating valves R function to adjust the pressures in the discharge hydraulic pressure lines D and the wheel hydraulic pressure lines B and at the wheel cylinders H to be equal to or smaller than a set value while cutting off the flows of brake fluid. Due to this, the pressure regulating valves R each include a selector valve 6 and a check valve 6a.

The selector valves 6 are normally open linear solenoid valves which are interposed between the output hydraulic pressure lines A1 which communicate with the master cylinder MC and the wheel hydraulic pressure lines B which communicate with the wheel brakes FL, FR, RL, RR. Although not shown in detail, a valve body of the selector valve 6 is biased towards the wheel hydraulic pressure lines B and the wheel cylinders H by means of an electromagnetic force matching a given electric current, so that when the pressures in the wheel hydraulic pressure lines B become higher by a predetermined value (this predetermined value depending on the given electric current) or greater than the pressure in the output hydraulic pressure line A1, the brake fluid escapes from the wheel hydraulic pressure lines B towards the output hydraulic pressure line A1, whereby the pressures in the wheel hydraulic pressure lines B are adjusted to a predetermined pressure.

The check valves 6a are connected in parallel to the selector valves 6. The check valves 6a are one-way valves which each permit only a flow of brake fluid from the output hydraulic pressure line A1 towards the wheel hydraulic pressure lines B.

The suction valves 7 are normally closed solenoid valves which are provided on the suction hydraulic pressure lines C and switch the suction hydraulic pressure lines C to an open state or a cut-off state. The suction valves 7 are opened by the control unit 100 when the selector valves 6 are closed, that is, when the brake hydraulic pressure is applied to the wheel brakes FL, FR, RL, RR without the operation of the brake pedal BP by the driver.

The pressure sensor 8 is intended to detect the brake hydraulic pressure in the output hydraulic pressure line A1 in the second system, that is, the master cylinder pressure, and the results of the detection are inputted into the control unit 100.

Next, the ECU 200 and the control unit 100 will be described in detail.

Figure 3:
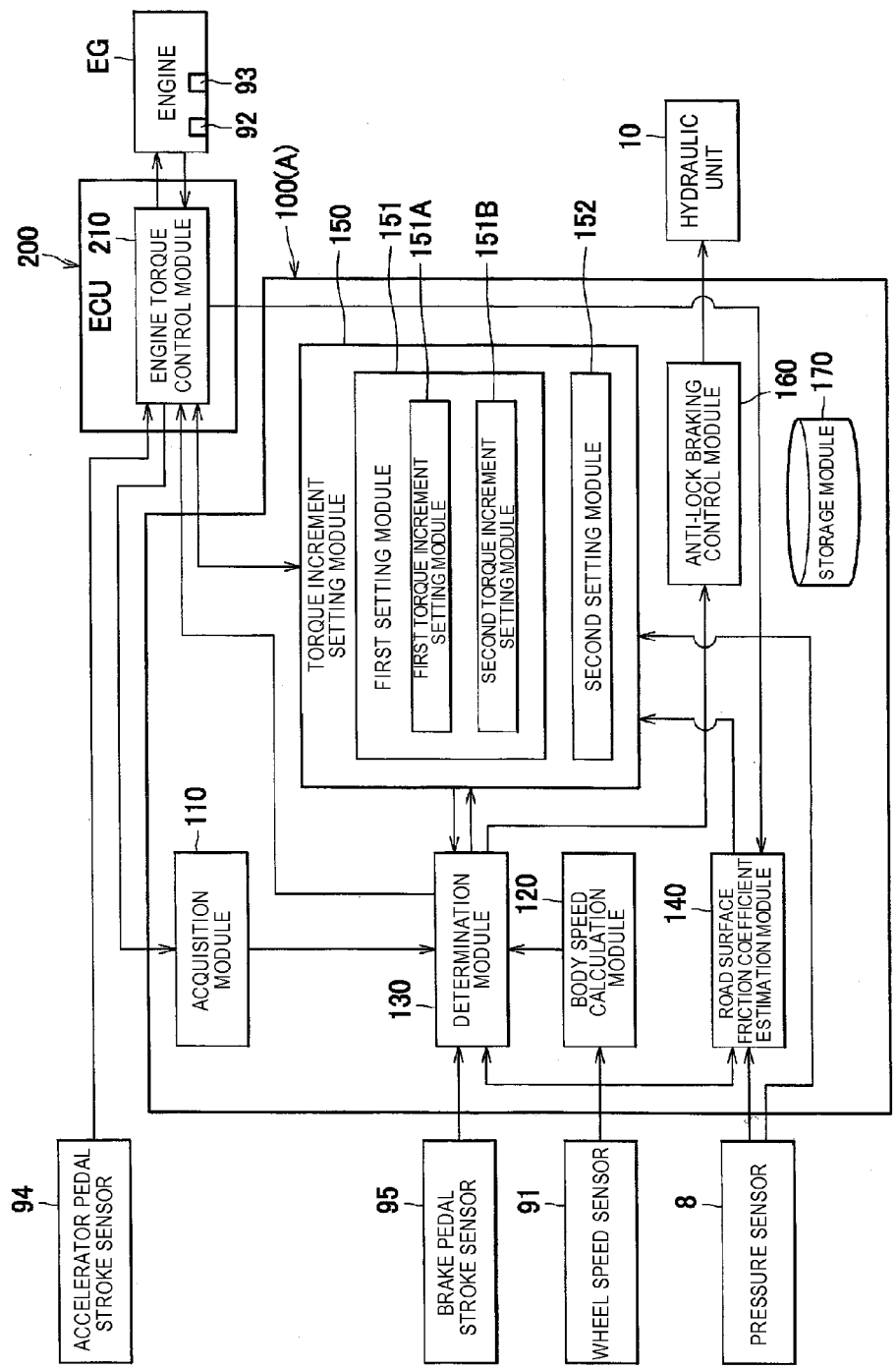
FIG. 3 is a block diagram showing the configuration of a control unit.

As shown in FIG. 3, the ECU 200 includes an engine torque control module 210 which can execute an engine brake torque control (hereinafter, also referred to as an "Engine Drag Torque Control" or "EDC") in which engine brake torque (drive source brake torque) which is exerted from the engine EG on the wheels W is controlled. The engine torque control module 210 controls the engine brake torque by setting target torque for drive torque which drives drive wheels based on a torque increment which is outputted from the control unit 100 using a well-known method and controlling the engine torque of the engine EG so that the drive torque of the drive wheels becomes the target torque.

For example, the engine torque control module 210 determines a target value of the engine torque from the target torque and an estimated gear ratio so that the drive torque of the drive wheels becomes the target torque and controls the engine torque so that an engine torque detected by the torque sensor 92 becomes the target value. The estimated gear ratio can be calculated based on an engine rotation speed detected by the engine rotation speed sensor 93 and an average wheel rotation speed of the drive wheels which is calculated based on signals from the wheel speed sensors 91.

The drive torque is torque which is transmitted to the drive wheels from the engine EG via a transmission (a speed reducer). Assuming that the drive torque to accelerate the vehicle CR is positive, the drive torque to decelerate the vehicle CR using the engine brake is negative. Then, the negative drive torque to decelerate the vehicle corresponds to the above-described engine brake torque.

The engine torque control module 210 calculates drive torque based on the engine torque acquired from the torque sensor 92 and the estimated gear ratio and outputs the calculated drive torque to a road surface friction coefficient estimating module 140. The engine torque control module 210 outputs the engine torque acquired from the torque sensor 92 and the target value of the engine torque to an acquisition module 110. When it is not receiving the torque increment from the control unit 100, the engine torque control module 210 executes the normal engine control based on an accelerator pedal operation amount and the like.

The control unit 100 functions to control the operation of the wheel brakes FL, RR, RL, FR by controlling the closing and opening of the control valve modules V, the pressure regulating valves R (the selector valves 6) and the suction valves 7 and the operation of the motor 9 in the hydraulic unit 10 based on signals from the sensors 8, 91, 94, 95. The control unit 100 also functions to set a torque increment for use in the EDC based on the signals from the sensors 8, 91, 94, 95. The control unit 100 contributes to the EDC by the ECU 200 by outputting the torque increment to the ECU 200.

The control unit 100 includes the acquisition module 110, a body speed calculation module 120, a determination module 130, the road surface friction coefficient estimating module 140, a torque increment setting module 150, an anti-lock braking control module 160 and a storage module 170.

The acquisition module 110 functions to acquire the engine torque outputted from the engine torque control module 210 and the target value of the engine torque. When it acquires the engine torque and the target value of the engine torque, the acquisition module 110 outputs the engine torque and the target value of the engine torque so acquired to the determination module 130.

The body speed calculation module 120 functions to calculate a body speed (vehicle body speed) Vc based on the wheel speeds Vw which are outputted from the wheel speed sensors 91. The body speed Vc can be calculated by various methods. A method is raised as one of those examples in which generally, when the magnitude of the acceleration or deceleration of the wheel speeds of the front wheels exceeds a predetermined upper limit value, the body speed is converted so that the acceleration or deceleration of the body speed takes its upper limit value. When the vehicle has an acceleration sensor which detects an acceleration of the vehicle in a front-to-rear direction, the body speed may be calculated based on the acceleration in the front-to-rear direction.

Then, when it calculates the body speed Vc, the body speed calculation module 120 outputs the calculated body speed Vc to the determination module 130.

The determination module 130 functions to determine not only whether or not the EDC can be executed but also whether or not an anti-lock braking control (a control of an Anti-lock Braking system: hereinafter, referred to as an "ABS") can be executed. Specifically, the determination module 130 functions to determine whether or not the wheel or wheels W tend to lock due to the engine brake based on the body speed Vc and the wheel speeds Vw and then functions to determine to execute the EDC when the determination module 130 determines that the wheel or wheels tend to lock.

Figure 9A:
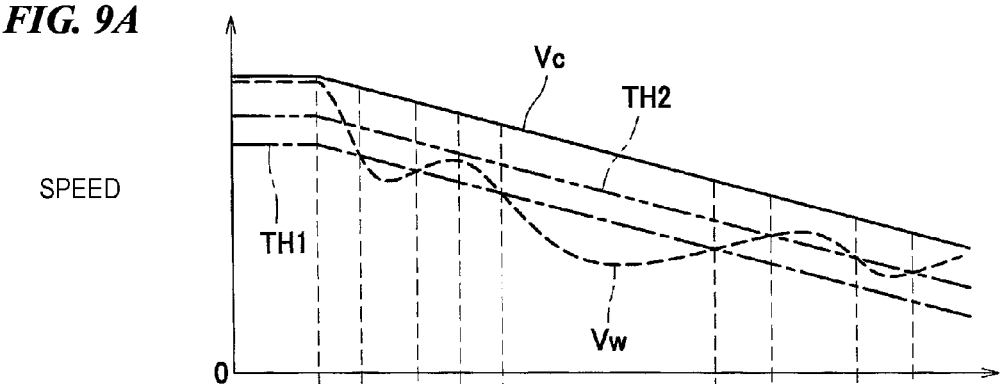
FIGS. 9A to 9F show time charts showing changes in parameters when only EDC is executed first and ABS and EDC are then executed simultaneously while a vehicle is decelerating.

To describe this in detail, the determination module 130 determines whether or not the EDC is executed by subtracting the wheel speeds Vw of the left and right drive wheels from the body speed Vc to calculate respective slip amounts of both the left and right drive wheels and determining whether or not the slip amounts of both the drive wheels reach or exceed a predetermined EDC intervention threshold TH1 (refer to FIG. 9A).

When the slip amounts of both the left and right drive wheels reach or exceed the EDC intervention threshold TH1 in such a state that the EDC is not executed, the determination module 130 also functions to determine that the left and right drive wheels tend to lock, determining that the EDC starts. When the slip amounts decrease to less than the EDC intervention threshold TH1 or the engine torque reaches its target value in such a state that the EDC is being executed, the determination module 130 also functions to determine that the EDC ends. In this embodiment, although the start threshold to start the EDC and the end threshold to end the EDC are both set to the same value (the EDC intervention threshold TH1), the invention is not limited thereto, and hence, the start threshold and the end threshold may be set to take different values.

Then, when the determination module 130 determines that the EDC starts or is in execution, the determination module 130 outputs a start signal or an in-execution signal which signals the start of the operation or the operation in execution to the torque increment setting module 150 and the engine torque control module 210. On the contrary, when the determination module 130 determines that the EDC ends, the determination module 130 outputs an end signal which signals the end of the operation to the engine torque control module 210. When receiving the start signal or the in-operation signal, the engine torque control module 210 executes the EDC, while when receiving the end signal, the engine torque control module 210 ends the EDC.

The determination module 130 functions to determine based on a signal from the brake pedal stroke sensor 95 whether or not the brake pedal BP is being depressed and also functions to determine whether or not the slip amounts reach or exceed an ABS start threshold TH2 (refer to FIG. 9A) to thereby determine whether or not the execution of the ABS starts. When the determination module 130 determines that the brake pedal BP is depressed and that the slip amounts reach or exceed the ABS start threshold TH2, the determination module 130 determines that the ABS starts. The determination module 130 calculates a slip amount for each wheel W, and when the condition of the slip amount of at least one of the plural wheels W matches the above-described condition, the determination module 130 determines that the condition of the slip amount is satisfied.

After having determined that the ABS starts, the determination module 130 outputs an ABS in execution signal which signals that the ABS is in execution to the torque increment setting module 150 and the anti-lock braking control module 160 until an end condition of the ABS is satisfied. The ABS end condition can be, for example, the release of the brake pedal BP which is being depressed.

Figure 4:
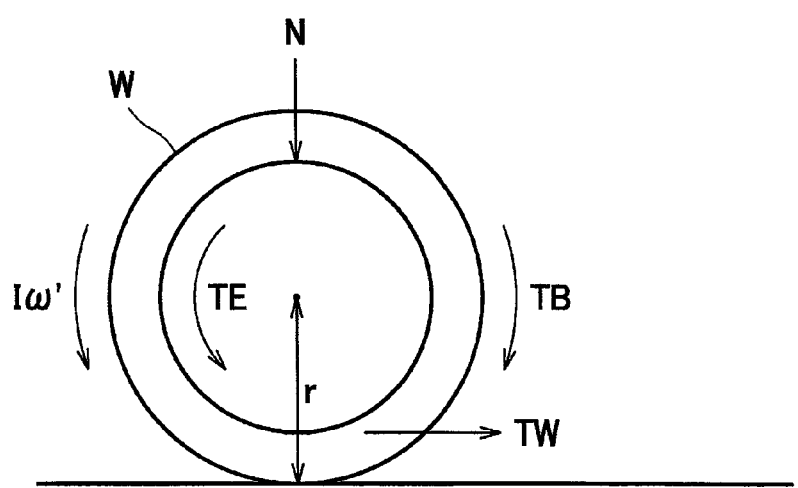
FIG. 4 is a drawing which explains parameters necessary to estimate a road surface friction coefficient.

The road surface friction coefficient estimation module 140 functions to estimate a road surface friction coefficient for each of the plural wheels W based on a parameter other than the body speed Vc. To describe this in detail, the road surface friction coefficient estimation module 140 is calculated a road surface friction coefficient using an expression (3) which is obtained from the following expressions (1) and (2). Parameters in the expressions (1) to (3) are shown in FIG. 4.

$$I \cdot \omega' = TW + TE - TB \quad (1)$$

$$TW = \mu \cdot N \cdot r \quad (2)$$

$$\mu = (I \cdot \omega' - TE + TB)/N \cdot r \quad (3)$$

where,
I: inertia moment;
$\omega'$: wheel acceleration;
TW: torque by road surface reaction force;
$\mu$: road surface friction coefficient;
N: wheel load;
r: effective radius of wheel;
TE: drive torque (engine torque×gear ratio);
TB: brake torque The wheel acceleration is calculated based on the wheel speed Vw detected by the wheel speed sensor 91. The brake torque is calculated based on the brake hydraulic pressure (the wheel cylinder pressure) which is estimated based on the master cylinder pressure detected by the pressure sensor 8 and the control history of the control valve module V. The drive torque is inputted into the road surface friction coefficient estimation module 140 from the engine torque control module 210.

When the road surface friction coefficient estimation module 140 estimates a road surface friction coefficient for each of the plural wheels W, the road surface friction coefficient estimation module 140 outputs the highest road surface friction coefficient among the plural estimated road surface friction coefficients to the torque increment setting module 150.

The torque increment setting module 150 is a module which sets a torque increment of the drive torque of the wheel W while the EDC is in execution and has a first setting module 151 and a second setting module 152.

The first setting module 151 is a module which sets a torque increment when the EDC is in execution but the ABS is not executed and at least, functions to set a torque increment based on the slip amount of the wheel W. To describe this in detail, the first setting module 151 has a first torque increment setting module 151A and a second torque increment setting module 151B.

The first torque increment setting module 151A functions to set an initial value of a torque increment based on the road surface friction coefficient outputted from the road surface friction coefficient estimation module 140 when it receives the start signal from the determination module 130, that is, when the determination module 130 determines that the EDC starts. To describe this in detail, the first torque increment setting module 151A sets an initial value of a torque increment based on the road surface friction coefficient and a map shown in FIG. 5A.

Figure 5A:
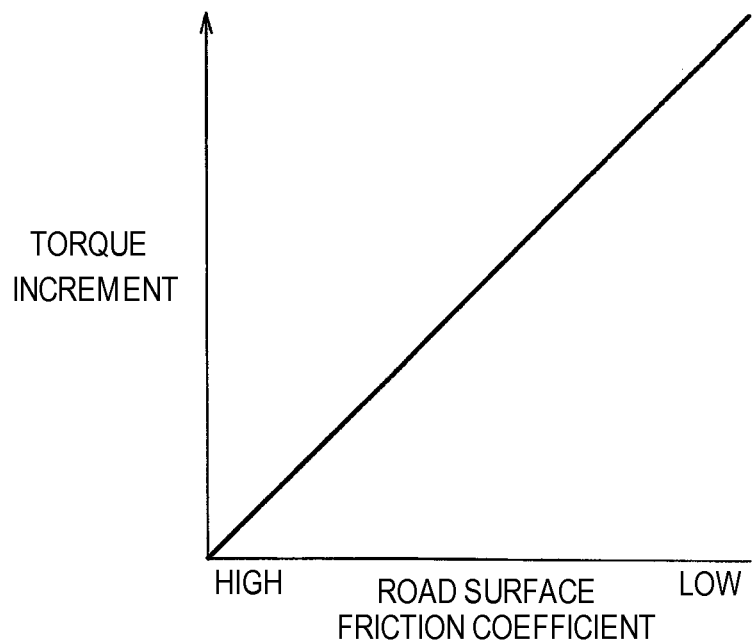
FIGS. 5A and 5B show maps to which a first setting module refers.

The map shown in FIG. 5A indicates a relationship between road surface friction coefficient and torque increment (initial value), and the map is set so that the torque increment increases as the road surface friction coefficient decreases.

The second torque increment setting module 151B is a module which sets a torque increment after the first torque increment setting module 151A has set the initial value of the torque increment and functions to set a torque increment based on the previous value of the torque increment and a variation in the slip amount. To describe this in detail, the second torque increment setting module 151B sets a torque increment by adding the previous value of the torque increment (for example, the initial value of the torque increment described above) and a correction amount obtained from a map shown in FIG. 5B together.

Figure 5B:
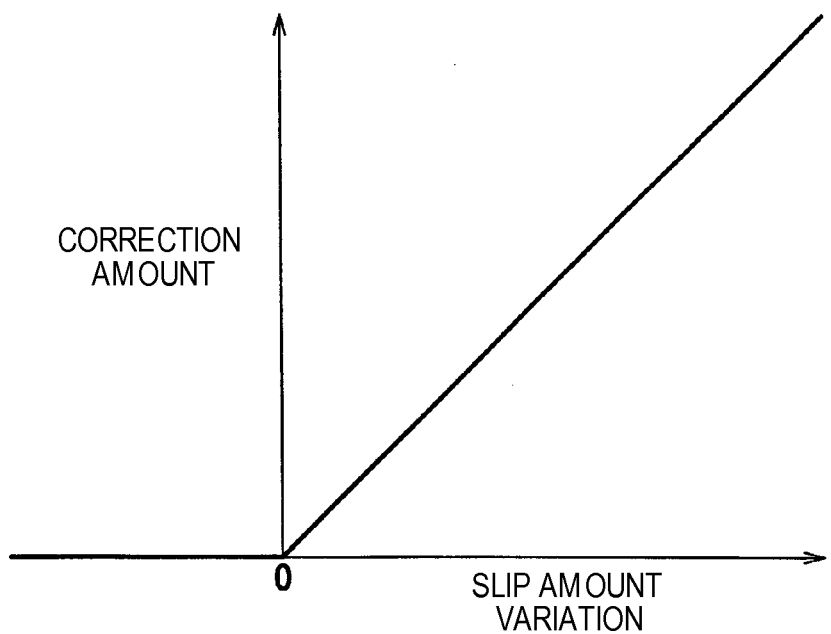

The map shown in FIG. 5B indicates a relationship between variation in the slip amount (=the current value−the previous value) and correction value. The map is set so that when the variation of the slip amount is equal to or smaller than 0, the correction value becomes 0, while when the variation in the slip amount is greater than 0, the correction value increases higher as the variation in the slip amount becomes greater. The correction value is an increment from the previous value of the torque increment.

Because of this, the second torque increment setting module 151B is configured so as to set so that the increment from the previous value of the torque increment becomes greater as the variation in the slip amount becomes greater when the variation in the slip amount is greater than 0. On the contrary, when the variation in the slip amount is equal to or smaller than 0, the second torque increment setting module 151B sets the previous value of the torque increment as a current value thereof by determining that the increment from the previous value of the torque increment is 0.

When the variation in the slip amount tends to decrease and the slip amount reaches or lowers below an end-start threshold TH3 (refer to FIG. 10) of the EDC, the second torque increment setting module 151B is configured so as to set the torque increment to a value resulting from subtracting a predetermined value from the previous value of the torque increment to thereby decrease the torque increment gradually with a predetermined gradient. The end-start threshold TH3 is set to a value which is slightly greater than the EDC intervention threshold TH1.

When both the EDC and the ABS are in execution, the second setting module 152 functions to set a torque increment based on a parameter other than the slip amount. To describe this in detail, the second setting module 152 sets a torque increment based on the road surface friction coefficient outputted from the road surface friction coefficient estimation module 140 and a map shown in FIG. 6.

The map shown in FIG. 6 indicates the relationship between road surface friction coefficient and torque increment. The map is set so that the torque increment increases higher as the road surface friction coefficient decreases lower. Namely, the map is set so that the engine brake is suppressed to a lower level as the road surface friction coefficient becomes lower as a result of the map being set so that the torque increment increases higher as the road surface friction coefficient decreases lower. In FIG. 6, "high," "medium," "low," and "extremely low" denote numerical ranges of the road surface friction coefficient, and the relationship in magnitude among the numerical ranges denoted is such that "high">"medium">"low">"extremely low." T1 to T4 are fixed values and are such that those with greater numbers at the end take greater values. To be more specific, a fixed value with a greater number at the end (for example, T2) is set to take a value which is equal to or greater than a fixed value with a smaller number at the end (for example, T1).

Namely, the relationship in magnitude among the fixed values T1 to T4 may be, for example, such that T1<T2<T3<T4 or may be such that T1=T2<T3<T4. The fixed value T1 may be 0, in which case the fixed values T2 to T4 may be set to values equal to or greater than 0.

In the map shown in FIG. 6, the values of the fixed values T1, T2 whose numerical ranges denoting the road surface frictional coefficient are equal to or greater than "medium" are set to such values that the magnitude of the engine brake torque becomes greater than 0. Because of this, when the road surface friction coefficient is a first threshold which separates the "medium" from the "low," the second setting module 152 sets the torque increment to a first set value which makes the magnitude of the engine brake toque greater than 0 by setting the torque increment to the fixed value T1 or the fixed value T2.

When the road surface friction coefficient is less than the first threshold, the second setting module 152 sets the torque increment to a second set value which is greater than the first set value by setting the torque increment to the fixed value T3 or the fixed value T4 which are greater than the fixed value T2. The respective values of the map shown in FIG. 6 can be set as required through experiments or simulations.

Once it sets the torque increment, the torque increment setting module 150 outputs the set torque increment to the engine torque control module 210.

When receiving the ABS in execution signal from the determination module 130, the anti-lock braking control module 160 functions to execute the well-known anti-lock braking control in which the brake hydraulic pressures exerted on the wheels W are controlled based on their slip amounts.

The storage module 170 stores the maps shown in FIGS. 5A, 5B and 6, the previous value of the torque increment, the previous values of the slip amounts, the threshold TH1 to TH3, and the expression (3).

Next, referring to FIG. 7, the operation of the control unit 100 will be described in detail. The control unit 100 executes the flowcharts shown in FIGS. 7 and 8 repeatedly while the vehicle CR is being driven.

Figure 7:
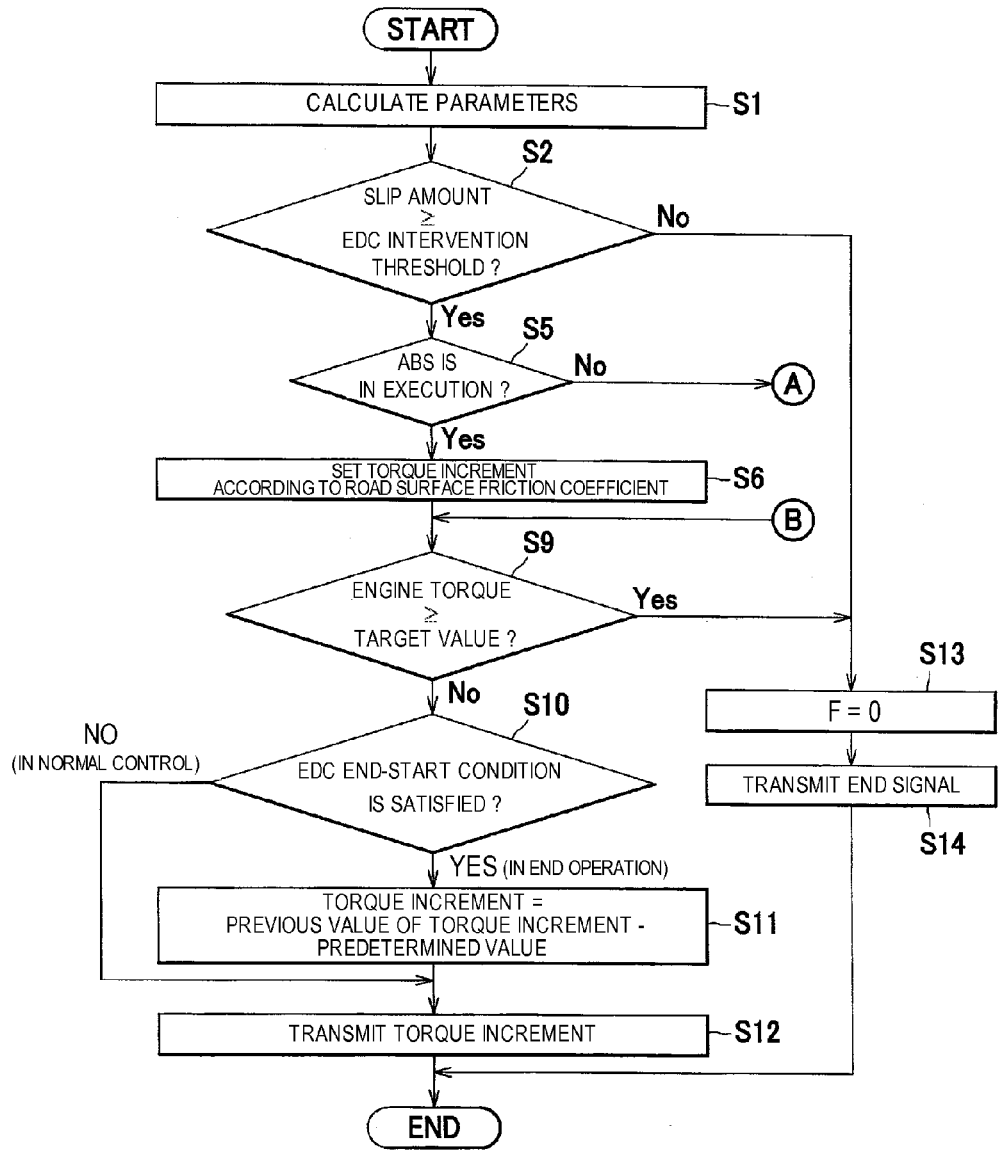
FIG. 7 is a flowchart showing operations of the control unit.

As shown in FIG. 7, the control unit 100 firstly calculates various parameters such as a road surface friction coefficient, slip amounts, and variations in slip amounts (S1). After step S1, the control unit 100 determines whether or not the slip amounts are equal to or greater than the EDC intervention threshold TH1 (S2).

If the control unit 100 determines in step S2 that the slip amounts are equal to or greater than the EDC intervention threshold TH1 (Yes), the control unit 100 determines whether or not the ABS is in execution (S5). If the control unit 100 determines in step S5 that the ABS is in execution (Yes), the control unit 100 sets a torque increment based on the road surface friction coefficient and the map in FIG. 6 (S6). After step S6, the control unit 100 determines whether or not the current engine torque is equal to or greater than the target value (S9).

If the control unit 100 determines in step S9 that the current engine torque is less than the target value (No), the control unit 100 determines whether or not the end-start condition of the EDC is satisfied (S10). Specifically, in step S10, the control unit 100 determines whether or not the end-start condition is satisfied by judging whether or not the variations in the slip amounts tend to decrease and the slip amounts are equal to or smaller than the end-start threshold TH3 of the EDC.

If the control unit 100 determines in step S10 that the end-start condition is satisfied (Yes), the control unit 100 re-calculates a torque increment by subtracting the predetermined value from the previous value of the torque increment (S11), and the flow proceeds to an operation in step S12. If the control unit 100 determines in step S10 that the end-start condition is not satisfied (No), the control unit 100 skips the operation in step S11 and then to proceeds to the operation in step S12.

In step S12, the control unit 100 transmits the set torque increment to the ECU 200. If the control unit 100 determines in step S2 that the slip amounts are less than the EDC intervention threshold TH1 (No) or determines in step S9 that the current engine torque is equal to or greater than the target value (Yes), the control unit 100 sets a flag F to 0 (S13) and transmits an end signal which signals the end of the EDC to the ECU 200 (S14).

Figure 8:
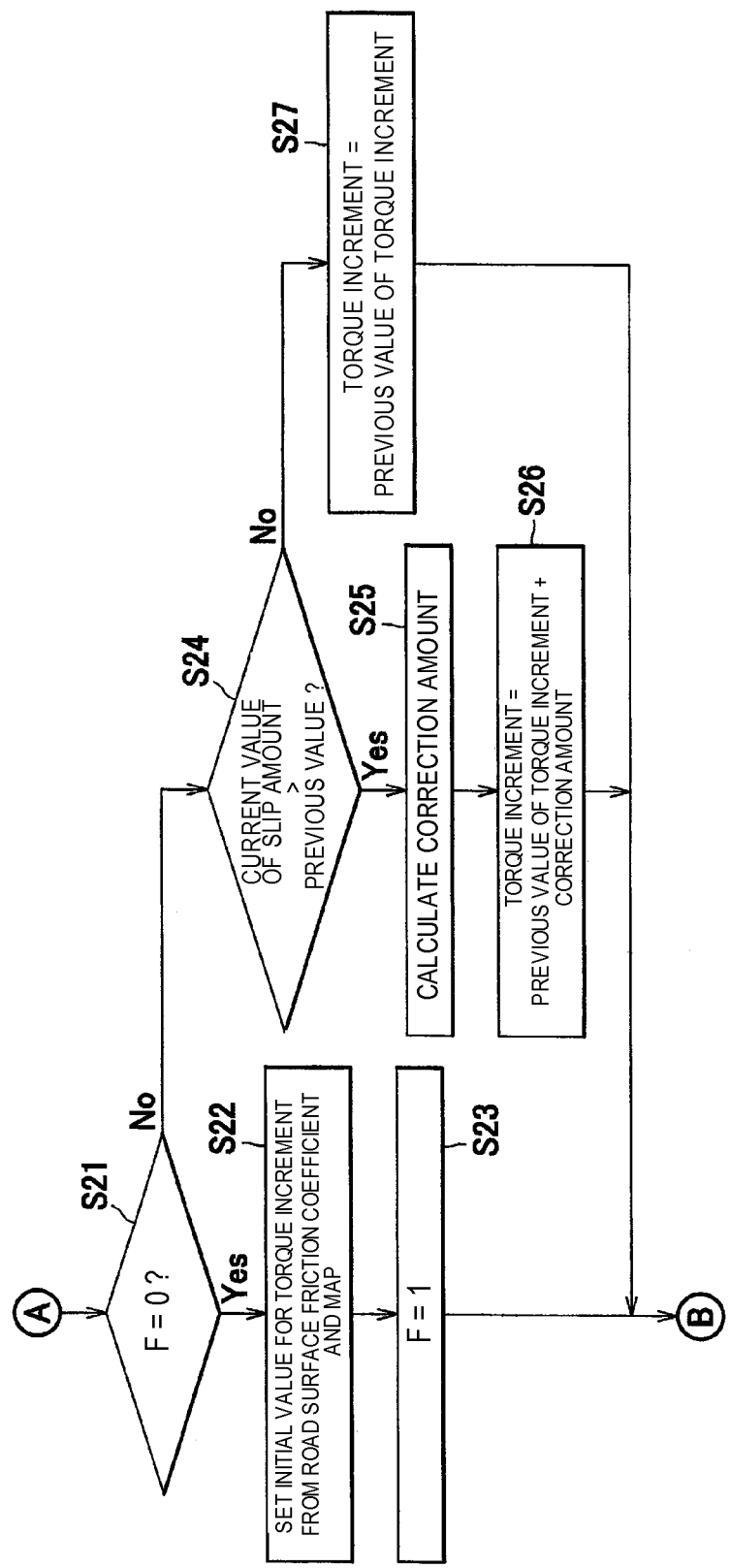
FIG. 8 is a flowchart showing the remainder of the flowchart shown in FIG. 7.

If the control unit 100 determines in step S5 that the ABS is not in execution (No), the control unit 100 determines whether or not the EDC is to be started now by determining whether or not the flag F is 0 as shown in FIG. 8 (S21). If the control unit 100 determines in step S21 that the flag F is 0 (Yes), the control unit 100 sets an initial value of the torque increment based on the road surface friction coefficient and the map in FIG. 5A (S22). After step S22, the control unit 100 set the flag F to 1 (S23) and proceeds to an operation in step S9 in FIG. 7.

If the control unit 100 determines in step S21 that the flag F is not 0 (No), the control unit 100 determines whether or not the current values of the slip amounts are greater than the previous values thereof (S24). If the control unit 100 determines in step S24 that the current values of the slip amounts are greater than the previous values thereof (Yes), the control unit 100 calculates a correction value based on the variations in the slip amounts and the map in FIG. 5B (S25).

After step S25, the control unit 100 calculates a torque increment by adding the correction amount to the previous value of the torque increment (S26) and proceeds to the operation in step S9 in FIG. 7. If the control unit 100 determines in step S24 that the current values of the slip amounts are equal to or smaller than the previous values thereof (No), the control unit 100 sets the previous value of the torque increment as a torque increment (S27) and proceeds to the operation in step S9 in FIG. 7.

Next, a torque increment which is set in the EDC when the ABS is not executed and a torque increment which is set in the EDC when the ABS is in execution will be described by reference to FIGS. 9A to 9F and 10. In FIG. 9D, "OFF" denotes that the EDC is not executed, "1" denotes a control mode which executes the EDC when the ABS is not executed, and "2" denotes a control mode which executes the EDC when the ABS is in execution. In FIG. 9E, "OFF" denotes that the ABS is not executed and "ON" denotes that the ABS is in execution.

Figure 9B:
Figure 9C:
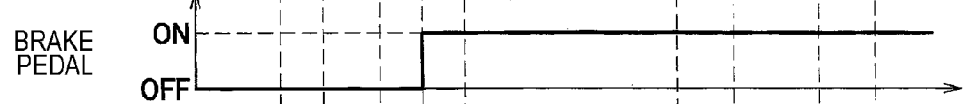
Figure 9D:
Figure 9E:

As shown in FIGS. 9A and 9B, when the engine brake is applied, causing the wheels W to slip as a result of the driver releasing the accelerator pedal AP depressed while he or she is driving the vehicle CR (time t1), the wheel speeds Vw decrease gradually in such a way as to move away from the body speed Vc. Thereafter, when the slip amounts reach the EDC intervention threshold TH1 (time t2), as shown in FIG. 9D, the control mode of the EDC is switched from OFF to 1, whereby the EDC starts.

Figure 10:
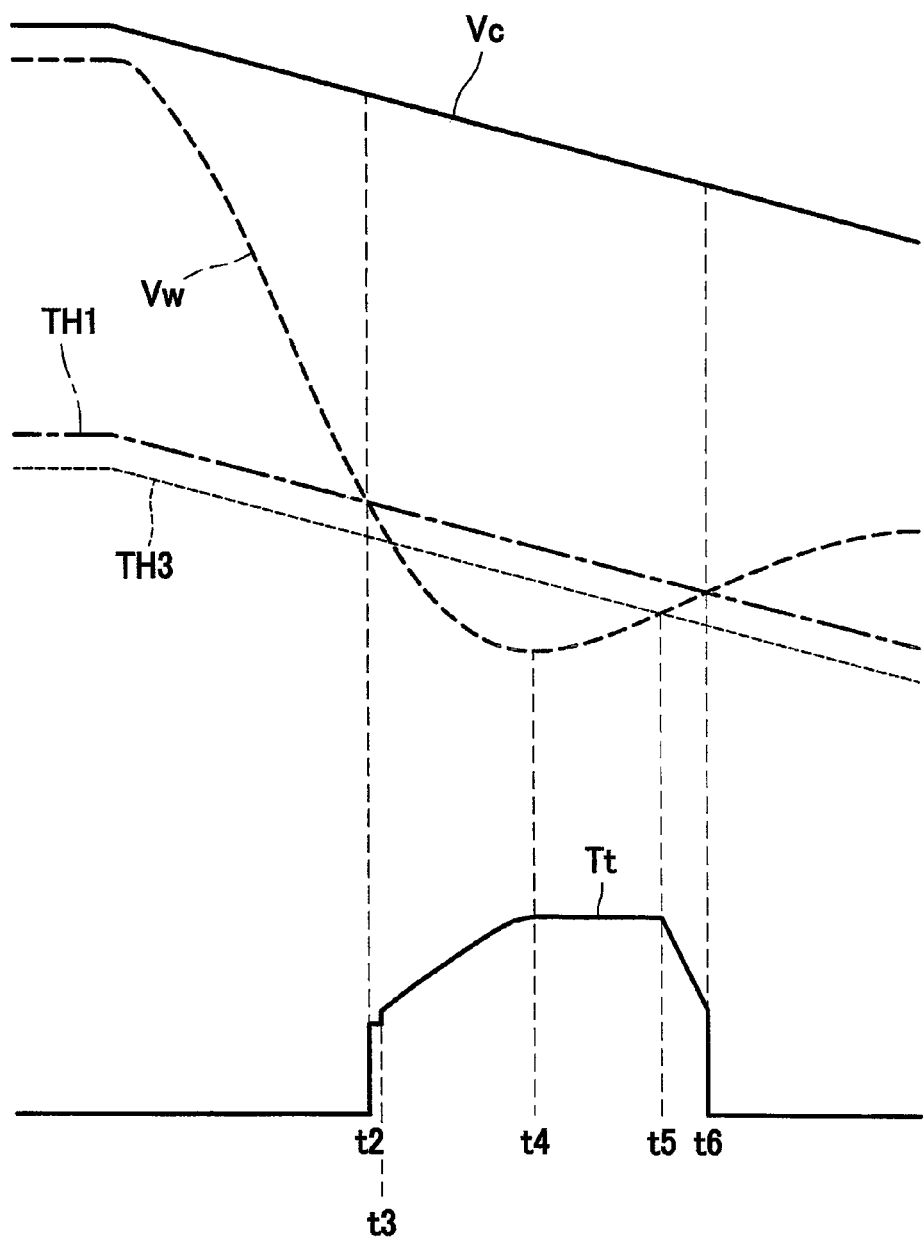
FIG. 10 is an enlarged view showing changes occurring in the parameters shown in FIGS. 9A and 9F around times t2 to t6.

When the control mode is 1, that is, when the ABS has not yet been started, the control unit 100 firstly sets a torque increment based on the road surface friction coefficient and the map in FIG. 5A to thereby set an initial value of a torque increment Tt at time t2 as shown in an enlarged fashion in FIG. 10. Next, the control unit 100 calculates correction amounts based on the variations in the slip amounts and the map in FIG. 5B and then sets the torque increment Tt by adding the correction amount to the initial value (the previous value) of the torque increment Tt (time t3).

In the example shown in FIGS. 9 and 10, since the variations in the slip amounts are substantially constant from time t3 to time t4, the correction values are set to substantially the same values in FIG. 5B. Due to this, as shown in FIG. 10, the torque increment Tt increases gradually with a predetermined gradient.

When the variations in the slip amounts become equal to or smaller than 0 (from time t4 onward), the control unit 100 set the previous value of the torque increment Tt as a current value. Thereafter, when the slip amounts change and tend to decrease to reach or lower below the end-start threshold TH3 of the EDC (time t5), the control unit 100 decreases gradually the torque increment Tt with a predetermined gradient by subtracting the predetermined value from the previous value of the torque increment Tt.

Thereafter, when the slip amounts decrease to reach the EDC intervention threshold TH1 (time t6), the control unit 100 sets the torque increment Tt to 0 and ends the EDC as shown in FIG. 9D. Thereafter, as shown in FIGS. 9A, 9C and 9E, in the event that the slip amounts are equal to or greater than the ABS start threshold TH2 when the driver depresses the brake pedal BP, the control unit 100 starts the execution of the ABS (time t7).

Thereafter, as shown in FIGS. 9A and 9D, when the slip amounts reach or exceed the EDC intervention threshold TH1 (time t8) again, the control mode of the EDC is switched from OFF to 2, whereupon the EDC starts.

Figure 9F:
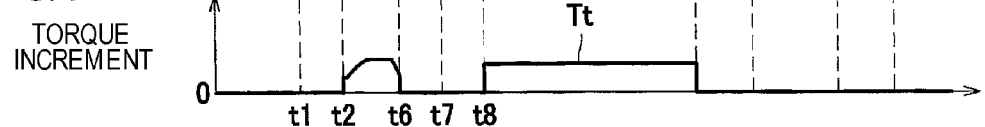

When the control mode is 2, that is, when the ABS is in execution, the control unit 100 sets a torque increment based on the road surface friction coefficient and the map in FIG. 6 to thereby set the torque increment Tt to the fixed value as shown in FIG. 9F (time t8). As this occurs, when the road surface friction coefficient is equal to or greater than the first threshold, the control unit 100 sets the torque increment Tt to the first set value where the magnitude of the engine brake torque is greater than 0, while when the road surface friction coefficient is less than the first threshold, the control unit 100 sets the torque increment Tt to the second set value which is greater than the first set value.

In this embodiment, although the torque increment Tt is set to take the constant value from time t8 onward, when the road surface friction coefficient changes halfway from time t8 onward, the torque increment Tt changes according to the road surface friction coefficient.

Thus, the embodiment can obtain the following advantages.

When both the EDC and the ABS are in execution (when the control mode is 2), since the torque increment Tt is set based on the road surface friction coefficient the parameter other than the slip amount, compared, for example, with the case where the EDC is executed based on the slip amounts during the ABS, an excessive engine brake can be restricted during the ABS, thereby making it possible to restrict the behaviors of the vehicle from becoming unstable.

When the road surface friction coefficient is less than the first threshold in the control mode of 2, for example, in the situation where the road surface friction coefficient a low μ, the torque increment Tt is set to the second set value which is greater than the first set value, and therefore, the engine brake can be suppressed to the lower level, whereby the influence of the engine brake can be reduced in the ABS. When the road surface friction coefficient is equal to or greater than the first threshold in the control mode of 2, for example, in the situation where the road surface friction coefficient a high μ, the torque increment Tt is set to the first set value which is smaller than the second set value, compared, for example, with a case where the torque increment Tt is set to the greater second value on the high-μ road surface, the output of the engine EG does not have to be lowered. This can reduce the level of noise generated in association with the increase in output of the engine EG.

Since the first set value is set to such a value that the magnitude of the engine brake torque is greater than 0, compared, for example, with a case where the magnitude of the engine brake torque is controlled to be 0, the brake hydraulic pressure and the engine brake can be made to work in cooperation, thereby making it possible to obtain an appropriate braking force. As long as the road surface friction coefficient being so high as to be equal to or greater than the first threshold, even when the torque increment Tt is made smaller, that is, the engine brake torque is made greater, there is no such situation that the slip amounts become excessive.

In the EDC with the ABS not being executed, the initial value of the torque increment Tt when the EDC starts is calculated without using the body speed Vc, and therefore, the initial drive torque can be set to an appropriate value without being affected by the body speed Vc. The second and later torque increments Tt are set based on the previous value of the torque increment Tt and the variations in the slip amounts, and therefore, the torque increment Tt can be set sufficiently accurately. The slip amounts are the differences between the body speed Vc and the wheel speeds Vw, and hence, the slip amounts will not be accurate unless the body speed Vc takes an accurate value. In contrast with this, the variations in the slip amounts rely more dominantly on the variations in the wheel speeds Vw than on the variation in the body speed Vc, and therefore, the variations in the slip amounts are less affected by the body speed Vc. Consequently, in setting the second and later torque increments Tt, too, compared, for example, with a case where the torque increment Tt is set simply based on the slip amounts, the setting is affected less by the body speed Vc, and therefore, the torque increments Tt can be set to appropriate values.

In this embodiment, the slip amounts, that is, the body speed Vc is used for the start conditions of the EDC, and therefore, when the value of the body speed Vc is inaccurate, there may be a risk of the start timing of the EDC deflecting from the appropriate timing. Even when this occurs, however, since the initial value of the torque increment Tt is set based on the road surface friction coefficient, the initial drive torque can be set to an appropriate value matching the road surface friction coefficient.

When the current values of the slip amounts is equal to or smaller than the previous values thereof, that is, when the wheel speeds Vw tend to recover, since the torque increment Tt is not decreased, the wheel speeds Vw can be recovered quickly.

Since the torque increment Tt decreases gradually within the period when the slip amounts stay within the range from the end-start threshold TH3 to the end threshold (the EDC intervention threshold TH1), the drastic increase in the engine brake can be restricted within the period, whereby the slip amounts can be restricted from increasing again which would otherwise be caused by the drastic increase in the engine brake.

When the engine torque reaches the target value, that is, when the slipping comes to an end, the EDC ends, and therefore, the torque control can be executed while preventing the driver from feeling a sensation of physical disorder.

Since the increment (the correction amount) from the previous value of the torque increment Tt becomes greater as the variations in the slip amounts become greater, the torque increment Tt can be set appropriately according to the variations in the slip amounts.

Since the initial value of the torque increment Tt is set based on the highest road surface friction coefficient among the plural road surface friction coefficients calculated for the plural wheels W, compared, for example, with a case where the initial value of the torque increment Tt is set based on the lowest road surface friction coefficient, the engine brake torque can be restricted from becoming too small which would otherwise be caused by the torque increment which has become too great.

The invention is not limited to the embodiment, and can be variously modified as described below. In the following description, like reference numerals will be given to like configurations to those described in the embodiment, and the description thereof will be omitted.

<First Modification>

In the embodiment, while the second setting module 152 is described as being configured so as to calculate the torque increment based on the road surface friction coefficient and the map in FIG. 6, the invention is not limited thereto. For example, a configuration may be adopted in which a second setting module 152 calculates a torque increment based on the body speed Vc and a map shown in FIG. 11.

The map shown in FIG. 11 indicates a relationship between body speed Vc and torque increment, and a torque increment is set to increase higher as the body speed Vc becomes faster. In FIG. 11, a "low speed," a "medium speed," and a "high speed" denote numerical ranges of body speed Vc. The relationship in magnitude among the numerical ranges is such that the "low speed"<the "medium speed"<the "high speed." T11 to T13 are all fixed values, and the relationship in magnitude among the fixed values is such that T11<T12<T13.

In the map shown in FIG. 11, the value of the fixed value T11 when the magnitude of the body speed Vc in the low speed range is set so that the magnitude of an engine brake torque becomes greater than 0. Due to this, when the body speed Vc is less than a second threshold which separates the low speed from the medium speed, the second setting module 152 sets the torque increment to the fixed value T11 to thereby set the torque increment to a first set value where the magnitude of engine brake torque becomes greater than 0.

When the body speed Vc is equal to or greater than a second threshold, the second setting module 152 sets the torque increment to the fixed value T12 or the fixed value T13 which is greater than the fixed value T11 to thereby set the torque increment to a second set value which is greater than the first set value. The second set value can be set, for example, to such a value that the magnitude of the engine brake torque becomes greater than 0. The values in the map shown in FIG. 11 can be set as required through experiments or simulations.

Figure 12:
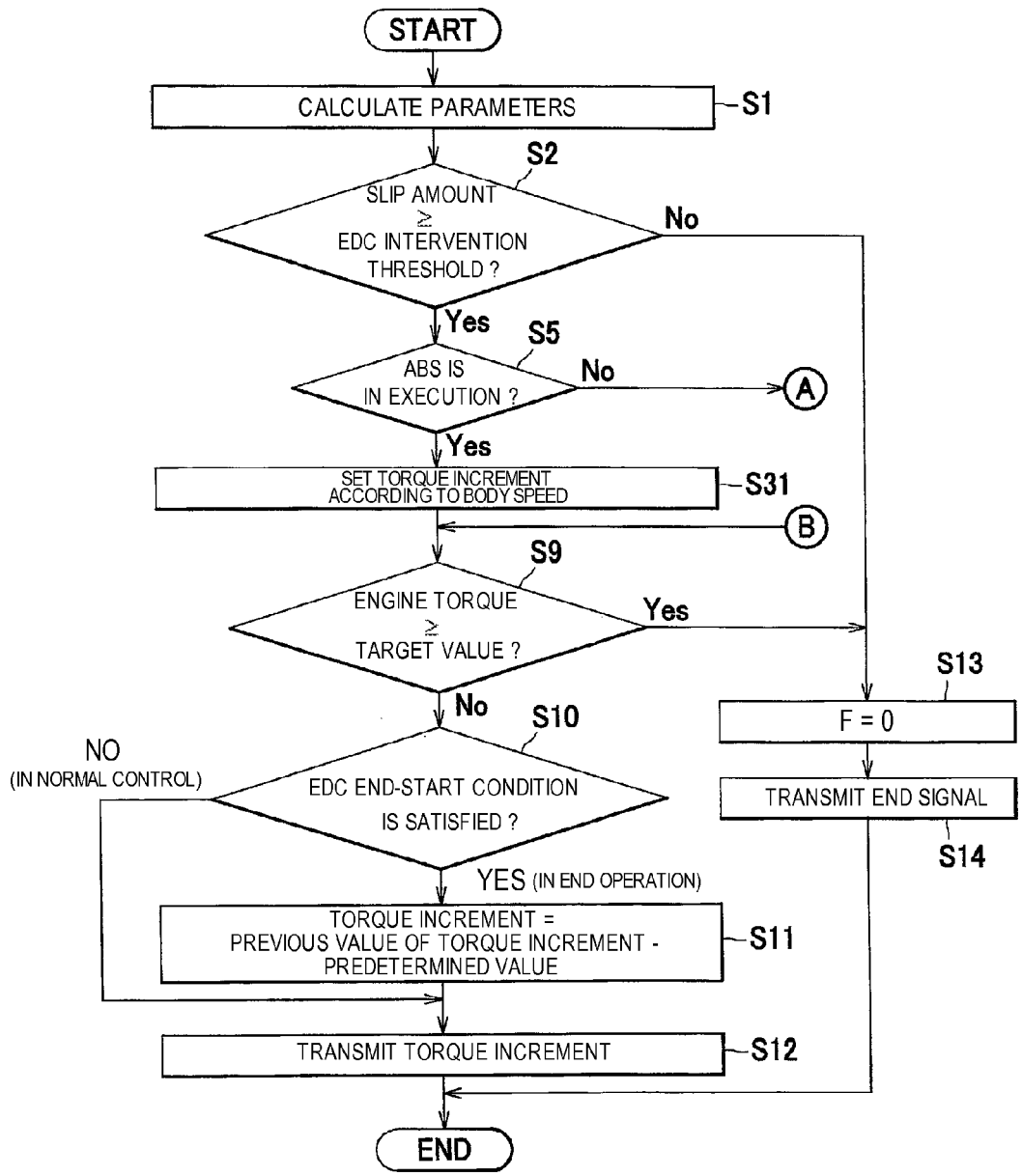
FIG. 12 is a flowchart showing operations of a control unit in the first modification.

When the second setting module 152 is configured as described above, the operation in step S6 in the flowchart shown in FIG. 7 may be replaced with a new step S31 shown in FIG. 12. In step S31, a control unit 100 sets a torque increment based on the body speed Vc and the map shown in FIG. 11.

According to this modification, when the body speed Vc is low speed, that is, when the body speed Vc is so low as to be less than the second threshold, the torque increment is set to the first set value which is smaller, and therefore, the noise generated by an increased output of the engine EG can be suppressed to a lower level. When the body speed Vc is slow like this, the torque increment is small, that is, even when the engine brake torque is increased, there is no such situation that the resulting slip amounts become too great.

When the body speed Vc is so high as to be equal to or greater than the second threshold, the torque increment is set to the great second set value, and therefore, the influence of the engine brake in the ABS can be reduced, thereby making it possible to restrict the behaviors of the vehicle CR from becoming unstable.

<Second Modification>

A second setting module 152 may be configured so as to calculate a torque increment based on a brake hydraulic pressure and a map shown in FIG. 13.

The map shown in FIG. 13 indicates a relationship between brake hydraulic pressure and torque increment. In the map, the torque increment is set so as to become greater as the brake hydraulic pressure increases higher. In FIG. 13, P1 to P3 denote numeric ranges of brake hydraulic pressure, and a relationship in magnitude among the numeric ranges is such that P1<P2<P3. T21 to T23 denote fixed values, and a relationship in magnitude among the fixed values is such that T21<T22<T23.

In the map shown in FIG. 13, the value of the fixed value T21 when the numeric range of the brake hydraulic pressure is P1 is set to such a value that the magnitude of engine brake torque becomes greater than 0. Because of this, when the brake hydraulic pressure is less than a third threshold which separates P1 from P2, the second setting module 152 sets the torque increment to the fixed value P21 to thereby set the torque increment to a first set value where the magnitude of the engine brake torque becomes greater than 0.

When the brake hydraulic pressure is equal to or greater than the third threshold, the second setting module 152 sets the torque increment to the fixed value T22 or the fixed value T23 which are greater than the fixed value T21 to thereby set the torque increment to a second set value which is greater than the first set value. The values in the map shown in FIG. 13 can be set as required through experiments or simulations.

Figure 14:
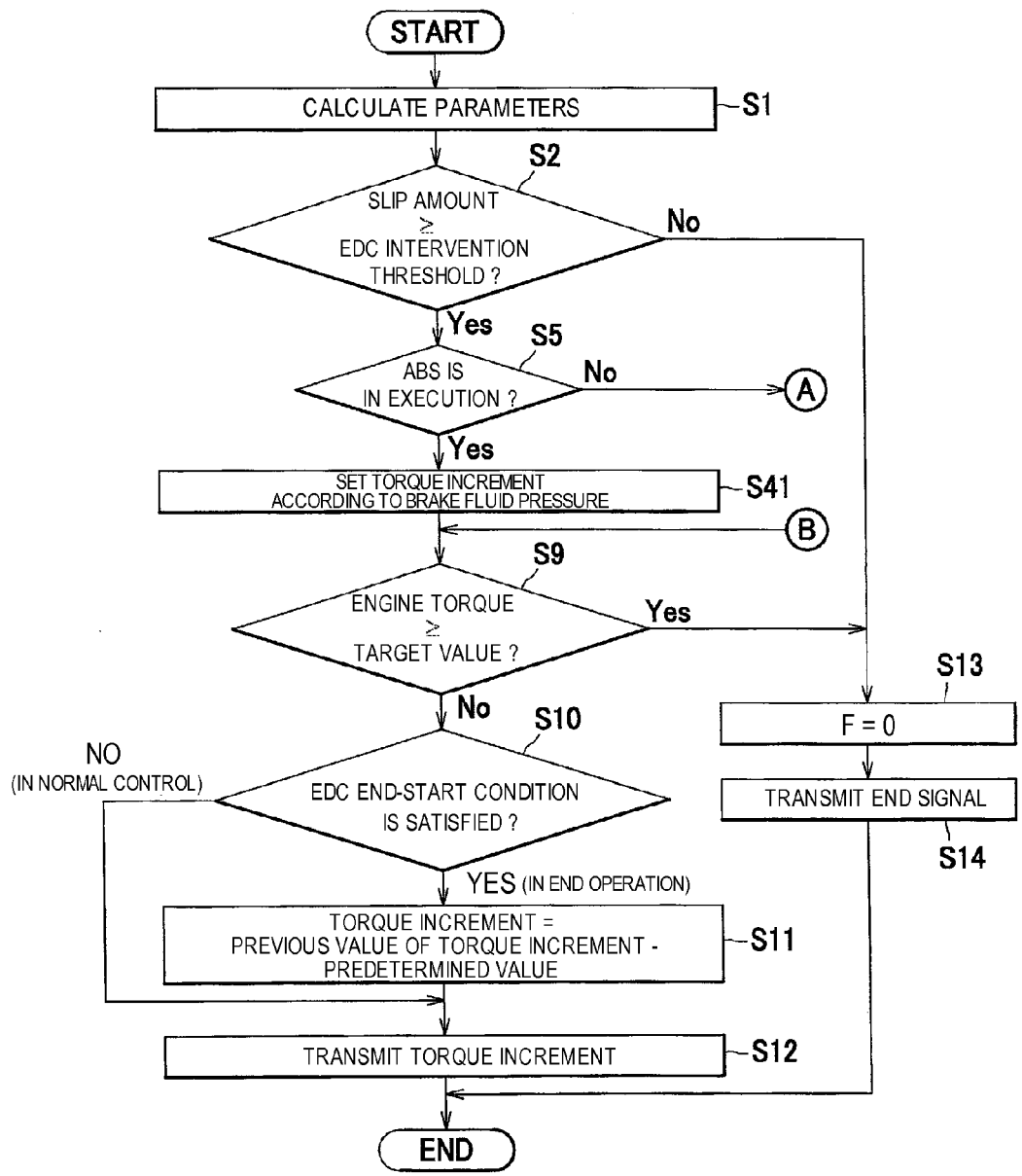
FIG. 14 is a flowchart showing operations of a control unit in the second modification.

When the second setting module 152 is configured as described above, the operation in step S6 in the flowchart shown in FIG. 7 may be replaced with a new step S41 shown in FIG. 14. In step S41, a control unit 100 sets a torque increment based on the brake hydraulic pressure and the map shown in FIG. 13.

According to this modification, when the brake hydraulic pressure stays within the range denoted by P1, that is, when the brake hydraulic pressure is so low as to be less than the third threshold, the torque increment is set to the first set value which is smaller, and therefore, the noise generated by an increased output of the engine EG can be suppressed to a lower level. When the brake hydraulic pressure is low like this, the torque increment is small, that is, even when the engine brake torque is increased, there is no such situation that the resulting slip amounts become too great. When the brake hydraulic pressure is so high as to be equal to or greater than the third threshold, the torque increment is set to the second set value, and therefore, the influence of the engine brake in the ABS can be reduced, thereby making it possible to restrict the behaviors of the vehicle CR from becoming unstable.

The parameter and condition which are used in calculating the torque increment in the second setting module 152 are not limited to one each and may be plural. For example, a configuration may be adopted in which a second setting module calculates a torque increment based on the road surface friction coefficient, a torque increment based on the body speed Vc and a torque increment based on the brake hydraulic pressure individually based on the road surface friction coefficient, the body speed Vc and the brake hydraulic pressure, as well as the maps shown in FIGS. 6, 11 and 13 so as to set an average value, a minimum value, a maximum value or a total value of the torque increments so calculated as a torque increment. The second setting module may be configured so as to set an appropriate torque increment according to a specific situation or may be configured so as to calculate an appropriate torque increment based on plural torque increments.

In the embodiment, while the engine EG is described as being the example of the drive source, the invention is not limited thereto. The drive source may be, for example, an electric motor which is provided in an electric vehicle or a hybrid electric vehicle.

In the embodiment, while the vehicle brake hydraulic pressure control unit A (the brake pressure control module) is described as being the vehicle control unit, the invention is not limited thereto. For example, the vehicle control unit may be made up of an ECU (a drive source control unit) and a vehicle brake hydraulic pressure control unit. As this occurs, for example, a torque increment setting module and a road surface friction coefficient estimation module may be provided in an ECU. However, when the road surface coefficient estimation module is provided in the vehicle brake hydraulic pressure control unit, a road surface friction coefficient which is estimated by the road surface friction coefficient estimation module can effectively used for controlling the brake hydraulic pressure.

In the embodiment, while the previous value of the torque increment is set as the current value thereof when the current values of the slip amounts are equal to or smaller than the previous values thereof, the invention is not limited thereto. For example, when the current values of the slip amounts are equal to or smaller than the previous values thereof, negative correction amounts may be set. The correction amounts when the variations in the slip amounts in the map in FIG. 5B are negative may be set so as to change with the same gradient of the correction amounts as when the variations in the slip amounts are positive.

In the embodiment, while the correction amounts are set according to the variations in the slip amounts, the invention is not limited thereto, and hence, the correction amounts may be set according to changes in the slip amounts. When the changes in the slip amounts tend to increase, positive correction amounts (fixed values) may be set, while when the changes in the slip amounts tend to decrease, negative correction amounts (fixed values) may be set or 0 may be set as correction values.

In the embodiment, while the engine brake torque control is described as being the example of the torque control, the invention is not limited thereto. For example, the torque control may be a traction control which restricts wheels from spinning on the road surface when the vehicle starts from a standstill.

In the embodiment, while the torque increment is described as being the torque increment of the drive torque of the wheels, the invention is not limited thereto. For example, the torque increment may be a torque increment of engine torque.

The invention claimed is:

1. A vehicle control unit which contributes to a torque control in which drive torque for a wheel is controlled based on a slip amount of the wheel, including:
   a road surface friction coefficient estimation module which estimates a road surface friction coefficient based on a parameter other than a body speed;
   a determination module which determines whether or not the torque control can be executed;

a first torque increment setting module which sets an initial value of a torque increment to be used in the torque control when the determination module determines that the torque control starts, the initial value of the torque increment being set based on the road surface friction coefficient;

a second torque increment setting module which sets a current value of the torque increment after the initial value has been set, the current value of the torque increment being set based on the previous value of the torque increment and a change in the slip amount; and a torque control module which applies the torque control based on the first torque increment setting module and the second torque increment setting module.

2. The vehicle control unit of claim 1, wherein the torque control is a drive source brake torque control in which drive source brake torque which is applied from a drive source to a wheel is controlled by controlling drive source torque.

3. The vehicle control unit of claim 2, wherein the second torque increment setting module is configured so as to set the previous value of the torque increment as the current value when a current value of the slip amount is equal to or smaller than the previous value.

4. The vehicle control unit of claim 2, wherein the second torque increment setting module is configured so as to reduce gradually the torque increment with a predetermined gradient when the slip amount becomes equal to or smaller than an end-start threshold.

5. The vehicle control unit of claim 2, further including:

an acquisition module which acquires a target value of the drive source torque, wherein the determination module determines that the torque control ends when the drive source torque reaches the target value.

6. The vehicle control unit of claim 2, wherein the second torque increment setting module increases an increment from the previous value of the torque increment greater as a variation in the slip amount becomes greater.

7. The vehicle control unit of claim 2, wherein the road surface friction coefficient estimation module estimates the road surface friction coefficient for each of plural wheels, and wherein the first torque increment setting module sets an initial value of the torque increment based on a highest road surface friction coefficient among the plural estimated road surface friction coefficients.

8. The vehicle control unit of claim 2, wherein the road surface friction coefficient is estimated based on brake torque, engine torque and wheel acceleration.

9. The vehicle control unit of claim 2, further including:

a brake pressure control module which controls a brake pressure applied to the wheel, wherein the brake pressure control module is included in the road surface friction coefficient estimation module.

10. The vehicle control unit of claim 2, wherein the determination module determines whether or not a wheel tends to lock due to a drive source brake based on a body speed and a wheel speed, and determines that the torque control starts when the determination module determining that the wheel tends to lock.

* * * * *